Jan. 28, 1958    E. C. MONTGOMERY    2,821,294
TANK LININGS
Filed Jan. 22, 1957
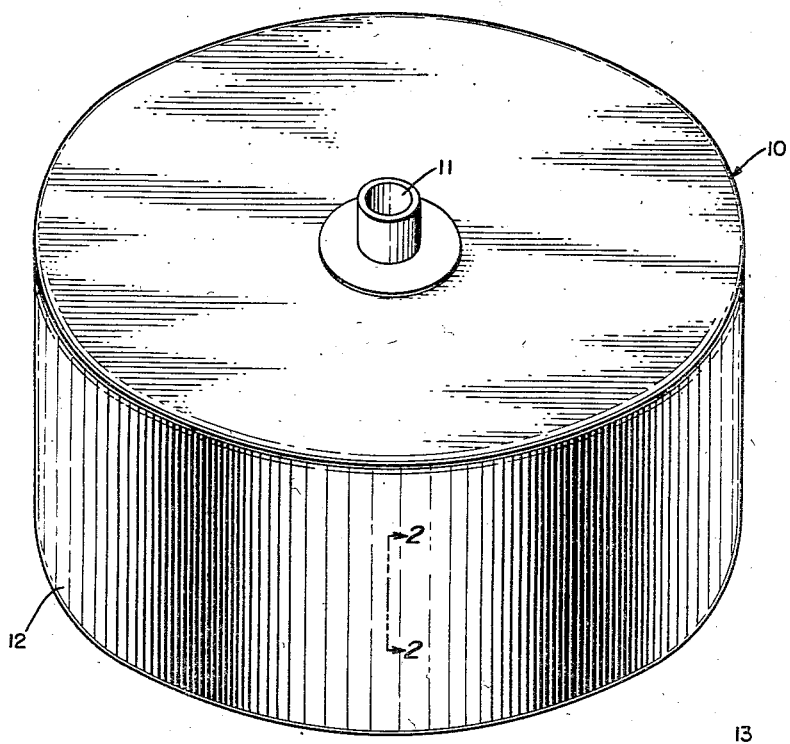
FIG. 1
FIG. 2
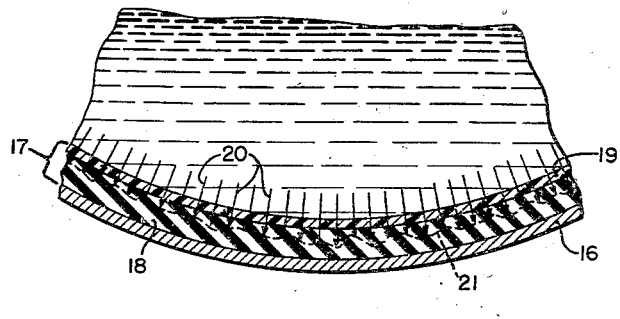
FIG. 3
INVENTOR.
EDWARD C. MONTGOMERY
BY
*R. L. Miller*
ATTORNEY

2,821,294
Patented Jan. 28, 1958

2,821,294
TANK LININGS

Edward C. Montgomery, Cuyahoga Falls, Ohio, assignor to The Goodyear Tire & Rubber Company, Akron, Ohio, a corporation of Ohio Application January 22, 1957, Serial No. 635,456

9 Claims. (Cl. 206—2)

This invention relates to containers for the transportation and storage of corrosive chemicals such as acids, alkalies, etc. and is more particularly concerned with an elastomeric lining which is resistant to corrosive action.

Many efforts have been made to fabricate tank linings which would prevent contact between corrosive chemicals being transported or stored and the container walls which are usually metal. Linings have been prepared from many non-corrosive materials such as glass, various elastomers such as, e. g., rubber, neoprene, polyisobutylene, etc. The hard linings, such as glass, porcelain, etc., are unsatisfactory because they chip and crack easily and allow the corrosive chemicals to attack the metal container walls. The various elastomeric materials have not proved to be entirely satisfactory, since many of them are not resistant to a wide variety of chemicals and because many of them present problems in fabrication. Also, many of the elastomeric compositions are not dimensionally stable and thus tend to crack under the stresses and strains of use, particularly in over-the-road tank cars.

The problem is particularly acute in the transportation and storage of acids, particularly the halide acids such as hydrochloric acid. Because of the chemical nature of many of the elastomeric materials, halogen acids react with the elastomeric materials to form hard, brittle surfaces. This problem has been particularly acute in the use of natural rubber which has proved to be the most useful elastomeric composition for tank linings. When hydrochloric acid is transported or stored in a tank lined with natural rubber, the hydrogen chloride reacts with the rubber molecules to form a hard brittle surface. This surface, under mechanical shock or distortion, tends to crack and thus opens fissures into the soft rubber, thus promoting further attack until the hydrochloric acid eventually makes contact with the metal shell. Thereafter, the reaction between the metal and the hydrochloric acid seriously weakens the shell.

It is a general object of this invention to provide an improved tank lining. It is another object of this invention to provide an improved process for lining tanks which are to be used in the transportation and storage of corrosive fluids. It is a further object of this invention to provide a corrosion resistant tank lining comprised of rubber coated with an elastomeric semi-permeable membrane. It is another object of this invention to provide a process for lining a tank with rubber coated with an elastomeric semi-permeable membrane.

In the practice of this invention, a container suitable for the handling of corrosive materials is lined with a corrosion barrier comprised of rubber having a rubbery, elastomeric semi-permeable membrane bonded thereto.

The containers for corrosive chemicals can be made from any of the customary materials which are used in making tanks and may be stationary or rolling tanks. Obviously, metal tanks are customarily used for this purpose because of the ease of fabrication and the low cost of the metal as compared with other structural materials. The practice of this invention is useful primarily in connection with metal tanks.

Although it is not completely understood how the practice of this invention is able to improve the life of a rubber lined tank, it is believed that the use of a soft elastomeric membrane, which doesn't readily become friable, over the rubber base tends to diffuse the corrosive chemical at the rubber surface and thus tends to cut down the effective concentration. In this manner, the transfer of the corrosive chemical through the rubber base to the metal shell is substantially inhibited. Thus, instead of having surface hardening and consequent cracking, the semipermeable membrane, although ineffective as a barrier in itself, allows penetration of the corrosive chemical into the rubber base at a greatly diminished rate so that the concentration present at a particular point or in a particular plane at a particular time is such that the rate of reaction and rate of hardening are greatly reduced. Although gradual hardening of the corrosion barrier takes place, the soft rubber base is maintained over a longer period of time than heretofore possible with conventional elastomeric linings. In this manner, the effective service life of rubber lined tanks can be increased as much as two to three times.

The rubber base is comprised of natural rubber or the synthetic rubber, cis 1,4 polymers of isoprene which may contain up to 15% of the trans polymer and which are similar to natural rubber in structure and use.

The soft elastomeric rubbery semi-permeable membrane overlay can be any of the known elastomers which are not readily attacked by corrosive chemicals, even though they are not alone entirely satisfactory as tank linings for tanks used in transporting or storing corrosive chemicals. Suitable rubbery elastomers are the neoprenes (polychloroprenes), the rubbery copolymers of butadiene and styrene which may contain from 50 to 75% by weight of butadiene, nitrile rubbers which are the rubbery copolymers of butadiene and acrylonitrile and chlorosulfonated polyethylenes which are known as Hypalons.

The neoprenes are rubbery polymers of a 2-chlorobutadiene-1,3, commonly known as polychloroprenes, or rubbery polymers of 2,3-dichlorobutadiene-1,3 or rubbery copolymers of a chlorobutadiene-1,3, with monomers copolymerizable therewith, such as isoprene, butadiene-1,3, styrene, acrylonitrile, etc. The typical neoprenes are known to the trade as "GN," "KN," "I," "GR–M," "AC," "CG," "GR–M–10" and others.

The corrosion barrier may be applied to the clean walls of a tank in any known manner. In the preferred practice, the rubber base is calendered to the desired thickness and the semi-permeable membrane calendered onto the base in a continuous operation after which the calendered sheets are applied to the tank walls in a conventional manner with or without the use of adhesives. Also, the base rubber can be applied to the tank walls as calendered sheets after which the semi-permeable membrane can be applied as calendered sheets or as a fluid. If desired, both layers may be applied in the form of fluids by spraying, painting, etc.

When the rubber is applied in the form of calendered sheets, it is preferred to use an adhesive system in order to insure greater permanency of the bond between the rubber base and the container walls. Any of the commonly known adhesives for securing rubber-to-metal bonds can be used for this purpose, examples of which are chlorinated rubbers, cyclized rubbers, etc., dissolved in suitable solvents, e. g., gasolene, solvent naphtha, aromatic hydrocarbons such as benzene, toluene or xylene, chlorinated solvents such as trichloroethylene or carbon tetrachloride, etc., to form cements. If the two layers are applied separately, it is preferred to use an adhesive between the layers such as one of the above adhesives or a natural rubber cement.

Although the thickness of the rubber base is not critical in the practice of the invention, the thickness of the base must be sufficient to provide the necessary corrosion barrier and must be thin enough to be practical from the standpoint of applying the base and the cost of the same. Corrosion tests have indicated that the optimum range, in thickness, is from about .025 inch to 1.0 inch, preferably about 0.16 to 0.48 inch gauge.

The rubbery elastomeric semi-permeable membrane must be thick enough to provide diffusion and decrease concentration of the corrosive liquid but thin enough to function in the described manner. It has been discovered that the membrane overlay can be from about .005 inch to about 0.125 inch thick, preferably from about .031 inch to .093 inch.

The use of a pure, soft gum rubber is preferred in the practice of this invention and may be compounded in the customary manner with conventional rubber compounding ingredients such as fillers, curing agents, accelerators, retarders, antioxidants and softeners. Because raw gum rubber is subject to degradation to a greater degree than vulcanized rubber, it is preferable to add a conventional curing agent such as, for example, sulfur or an organic peroxide, etc., and one of the customary accelerators such as a thiazole, a dithiocarbamate and/or other known organic accelerators. Curing may be accomplished by any of the customary methods used in curing tank linings. For example, small containers may have the corrosion barriers cured by inserting the entire tank into a standard heater and large tanks may be cured by means of live steam with or without pressure. Customarily, the vulcanizing temperature will range from about 212° F. to 320° F.

In the drawings Fig. 1 is a perspective of a tank made according to this invention; Fig. 2 is a cross section taken along the lines 2—2 of Fig. 1 and Fig. 3 is a cross section of a tank made according to this invention which contains a corrosive liquid.

The tank 10 of Fig. 1 having an annular opening 11 is illustrative of the tanks which are customarily used in the transportation and/or storage of corrosive material, particularly corrosive liquids. Obviously, the type of tank and composition of the same constitute no part of this invention. The containers or tanks can be made from any of the customary materials that are used in the fabrication of containers and will be adapted to the use intended and the nature of the corrosive material being transported and/or stored. Fig. 2 illustrates a cross section of a typical tank lined in accordance with the practice of this invention showing a container wall 12 having a corrosion barrier 13 laminated thereto. The corrosion barrier 13 is comprised of a base 14 which is made from rubber and a semi-permeable membrane 15 which may be made from any elastomeric rubber which is not substantially degraded by corrosive chemicals. Fig. 3 further illustrates the invention by showing a cross section of a typical tank containing corrosive liquid. A container wall 16 is shown in cross section having a corrosive barrier 17 laminated thereto comprised of a rubber base 18 having a semi-permeable membrane 19 adhered to the exposed surface of the rubber. The arrows 20 and the dotted line 21 are used to show the diffusion of the corrosive liquid as it penetrates the semi-permeable membrane 19.

The practice of the invention is further illustrated by the following examples which are not intended to be limitations on the scope of the invention.

*Example 1*

Test samples were made in the following manner. An unvulcanized pure natural gum rubber containing about 2% by weight of sulfur was calendered into sheets approximately .025 inch thick. The sheets of rubber were cut into strips about one inch wide. Several strips were coated on each side to a thickness of about .019 inch with neoprene, several other strips being left uncoated for comparison. Thereafter, the strips were cured in a rubber press at 1500 p. s. i. ram pressure at a temperature of 290° F. for a period of 40 minutes.

The cured samples were tested by immersion in 44% hydrochloric acid at a pressure of 80 p. s. i. and a temperature of 110° F. Various sets of samples were treated for 60, 121 and 182 days, respectively.

The depth of penetration of the acid was used as a measure of the ability of the sample to function as a corrosion barrier. The penetration of the acid was measured in two ways. Some of the samples were cut and then treated with silver nitrate to form white silver chloride with the HCl after which the depth could be easily measured. Another method used was to probe the sample with a sharp instrument until the penetration interface was reached, after which the depth could be measured by microscopic analysis. The penetration interface was in the form of an irregular plane in every instance so the depth measurements were approximations, but quite satisfactory because the penetration interface was quite distinguishable, the acid containing portion being much harder than the soft gum rubber underneath.

The test samples indicated that the acid penetrated the coated strips at a much slower rate than the uncoated strips and that there was much less hardening and cracking of the coated strips.

*Example 2*

Additional tests were conducted according to the description in Example 1 except that butadiene-styrene rubber, containing about 60% by weight of butadiene was used as the coating composition. These tests disclosed that natural rubber coated with butadiene-styrene rubber are superior corrosion barriers to natural rubber alone.

*Example 3*

Additional tests were conducted according to the description in Example 1 except that butadiene-acrylonitrile rubber, containing about 60% by weight of butadiene was used as the coating composition. These tests disclosed that natural rubber coated with butadiene-acrylonitrile rubber are superior corrosion barriers to natural rubber alone.

Additional tests were made according to Examples 1–3 except that steel strips were used as the base. The strips were coated and cured as described. These results also disclosed that the elastomer coated rubber samples resisted acid penetration and consequent hardening to a much greater degree than did the samples coated only with rubber.

The efficacy of the invention is further illustrated by tests wherein railroad tank cars were lined and placed in actual service where they carried various corrosive materials customarily found in such service.

One tank car was lined only with a gum rubber stock. This natural gum rubber stock contained about 2% by weight of sulfur, 1% by weight of stearic acid, 1% by weight of phenyl beta naphthylamine, ½% by weight of mercapto benzo thiazole, all percentages being based on the weight of rubber. The stock was calendered to a thickness of about ¼ inch and applied to the inside of the tank by means of a cement comprised of cyclized rubber dissolved in solvent naphtha and a natural rubber cement made by dissolving natural rubber in solvent naphtha. Thereafter, the tank lining was cured by subjecting it to steam at a temperature of 275° F. and pressure of 30 p. s. i. for a period of 4 hours.

Another tank was lined with a compounded crude natural rubber according to the process disclosed above.
The rubber was compounded as follows:

| | Parts |
|---|---|
| Crude rubber | 100.0 |
| Sulfur | 3.00 |
| Zinc oxide | 5.00 |
| Carbon black | 75.00 |
| Stearic acid | 1.0 |
| Phenyl beta naphthylamine | 1.0 |
| Coal tar resin | 5.00 |
| Coal tar oil | 5.00 |
| Mercaptobenzothiazole | 1.0 |

Another car was lined according to the preferred practice of this invention, using the method discussed above. A soft gum rubber stock, identical to that disclosed above, was used except that the base rubber had a thin veneer of neoprene about 1/16 inch thick calendered onto it before the slabs were installed in the tank. The neoprene was compounded as follows:

| | Parts |
|---|---|
| Neoprene[1] GRT | 100.0 |
| Zinc | 5.0 |
| Magnesium oxide | 4.0 |
| Carbon black | 50.0 |
| Stearic acid | .5 |
| Phenyl beta naphthylamine | 2.0 |
| Light process oil | 10.0 |

[1] A sulfur modified chloroprene polymer stabilized by thiuram disulfide.

The above tanks were all inspected after several months of service. The gum rubber lined tank lining showed definite signs of chemical attack. The compounded rubber lining was hardened and embrittled. The lining of the tank lined according to this invention was uneffected by the several months of service.

While certain representative embodiments and details have been shown for the purpose of illustrating the invention, it will be apparent to those skilled in this art that various changes and modifications may be made therein without departing from the spirit or scope of the invention.

I claim:

1. A container suitable for the handling of corrosive fluids comprised of a tank having an elastomeric coating attached to the walls thereof comprised of a base rubber bonded on one side to the walls of the container, the said base rubber having a rubbery, semi-permeable membrane overlay bonded thereto on the other side.

2. A container suitable for the handling of corrosive fluids comprised of a tank having an elastomeric coating attached to the walls thereof comprised of a base rubber selected from the group consisting of natural rubber and 1,4 polymers of isoprene bonded on one side to the walls of the container, the said base rubber having a rubbery, semi-permeable membrane overlay bonded thereto on the other side.

3. The product according to claim 2, wherein the rubbery, semi-permeable membrane overlay is selected from the group consisting of polychloroprene, the rubbery copolymers of butadiene and styrene, chlorosulfonated polyethylene and the rubbery copolymers of butadiene and acrylonitrile.

4. The product according to claim 3 wherein the rubbery semi-permeable membrane overlay is about .005 to 0.125 inch in thickness.

5. The product according to claim 3 wherein the base rubber is natural rubber.

6. The process of preparing a container suitable for handling of corrosive chemicals comprising (1) placing a layer of gum rubber containing a vulcanizing agent on the walls of the container, (2) placing a layer of a rubbery semi-permeable membrane having a thickness substantially less than the gum rubber layer on the gum rubber layer, and (3) curing the gum rubber layer having the semi-permeable membrane thereon in order to adhere the gum rubber layer to the walls of the container and in order to adhere the semi-permeable membrane layer to the gum rubber base.

7. The process according to claim 6 wherein the rubbery semi-permeable membrane overlay is selected from the group consisting of polychoroprene, the rubbery copolymers of butadiene and styrene, chlorosulfonated polyethylene and the rubbery copolymers of butadiene and acrylonitrile.

8. The process according to claim 7 wherein the rubbery semi-permeable membrane overlay is from .005 to 0.125 inch thick.

9. The process of preparing a container suitable for the handling of corrosive chemicals comprising (1) calendering a sheet of natural gum rubber containing about 2% by weight of sulfur to a thickness of about .025 to 1.0 inch, (2) calendering a layer of neoprene onto said natural gum rubber to a thickness of about .005 to .125 inch, (3) adhering said calendered stock to the inside of a metal tank by means of a cement and (4) curing the lining by means of steam at a temperature of about 275° F. and a pressure of about 30 p. s. i. for a period of about four hours.

References Cited in the file of this patent

UNITED STATES PATENTS

| 1,931,309 | Thompson | Oct. 17, 1933 |
| 2,311,308 | Thomas et al. | Feb. 16, 1943 |